(12) United States Patent
Takagi et al.

(10) Patent No.: US 10,787,555 B2
(45) Date of Patent: Sep. 29, 2020

(54) EXPANDED PARTICLE MOLDED ARTICLE

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 16/337,690

(22) PCT Filed: Oct. 2, 2017

(86) PCT No.: PCT/JP2017/035810
§ 371 (c)(1),
(2) Date: Mar. 28, 2019

(87) PCT Pub. No.: WO2018/066505
PCT Pub. Date: Apr. 12, 2018

(65) Prior Publication Data
US 2020/0032024 A1 Jan. 30, 2020

(30) Foreign Application Priority Data
Oct. 3, 2016 (JP) ................................. 2016-196032

(51) Int. Cl.
*C08J 9/22* (2006.01)
*C08J 9/224* (2006.01)
*C08J 9/228* (2006.01)
*C08J 9/232* (2006.01)
*C08J 9/20* (2006.01)

(52) U.S. Cl.
CPC ................ *C08J 9/232* (2013.01); *C08J 9/20* (2013.01); *C08J 2203/06* (2013.01); *C08J 2203/22* (2013.01); *C08J 2205/044* (2013.01); *C08J 2353/00* (2013.01)

(58) Field of Classification Search
CPC . C08J 9/232; C08J 9/20; C08J 2203/06; C08J 2203/22; C08J 2205/044; C08J 2353/00; C08J 2201/034; C08J 2201/026; C08J 9/16; C08J 9/228
See application file for complete search history.

(56) References Cited

U.S. PATENT DOCUMENTS 5,071,883 A * 12/1991 Kuwabara .............. C08J 9/0066
521/56
2002/0143077 A1 10/2002 Sueda et al.
2009/0029143 A1 1/2009 Kanae et al.

FOREIGN PATENT DOCUMENTS

| CN | 1369520 C | 9/2002 |
|---|---|---|
| CN | 1252171 C | 4/2006 |
| CN | 101155864 A | 4/2008 |
| JP | 2000-154270 A | 6/2000 |
| JP | 2001-164021 A | 6/2001 |
| JP | 2003-206364 A | 7/2003 |
| JP | 2005-060566 A | 3/2005 |
| JP | 2006-022138 A | 1/2006 |
| JP | 2006022138 A * | 1/2006 |
| JP | 2007-169527 A | 7/2007 |
| JP | 2008-533289 A | 8/2008 |
| JP | 2011-184574 A | 9/2011 |
| JP | 2012-201820 A | 10/2012 |
| JP | 2014-173012 A | 9/2014 |
| JP | 2016-222807 A | 12/2016 |
| WO | 2016/181714 A1 | 11/2016 |

OTHER PUBLICATIONS

Office Action dated Jan. 15, 2020, in corresponding Chinese Patent Application No. 201780061109.8.
International Search Report for PCT/JP2017/035810 dated Dec. 26, 2017 and English Translation submitted herewith (5 pages).

* cited by examiner

*Primary Examiner* — Kara B Boyle
(74) *Attorney, Agent, or Firm* — Fitch, Even, Tabin & Flannery LLP

(57) ABSTRACT

The present invention is concerned with an expanded beads molded article of expanded beads comprising a crosslinked multi-block copolymer containing a polyethylene block and an ethylene/α-olefin copolymer block, wherein a density is 40 to 150 g/L; a gel fraction by a hot xylene extraction method is 30 to 70% by weight; a tensile elongation is 120% or more; a bead weight of the expanded beads is 0.8 to 8 mg; and the number of expanded beads per unit area on a surface of the expanded beads molded article is 5 to 30 per $cm^2$, and is able to provide an expanded beads molded article which is light in weight and favorable in surface properties, fusion bondability, and durability.

6 Claims, No Drawings

EXPANDED PARTICLE MOLDED ARTICLE

CROSS-REFERENCE TO RELATED APPLICATIONS

This application is a U.S. national phase application filed under 35 U.S.C. § 371 of International Application Number PCT/JP2017/035810, filed Oct. 2, 2017, designating the United States, which claims priority from Japanese Application Number 2016-196032, filed Oct. 3, 2016.

FIELD OF THE INVENTION

The present invention relates to an expanded beads molded article.

BACKGROUND OF THE INVENTION

Expanded polyolefin-based resin beads can be molded into various shapes depending on purposes thereof. An expanded polyolefin-based resin beads molded article obtained from the expanded beads through in-mold molding is applied to a wide range of purposes including various kinds of a packaging or cushioning material, a shock absorber for automobiles, a building material, and the like. Meanwhile, as expanded beads molded articles to be used for a seat cushioning material, a cushioning material, or the like, a molded article which has not only cushioning properties against shock but also lighter weight and flexibility and which is small in compression set and excellent in restorability is demanded.

As a novel expanded article suitable for these uses and capable of replacing the polyolefin-based resin beads expanded molded article, an expanded article containing an ethylene/α-olefin multi-block copolymer which is excellent in flexibility is proposed (see, for example, PTL 1).

CITATION LIST

Patent Literature

PTL 1: JP 2008-533289 A

SUMMARY OF INVENTION

However, with respect to the crosslinked expanded article of an ethylene/α-olefin copolymer described in PTL 1, only an expanded article in a high density region in which the density is 150 to 600 g/L is described, and it was insufficient from the viewpoints of lightweight properties and flexibility. In addition, though a production method of expanded beads of the ethylene/α-olefin copolymer is disclosed, an expanded beads molded article is not disclosed.

In addition, on the occasion of in-mold molding of expanded beads of an ethylene/α-olefin copolymer, it was difficult to obtain an expanded beads molded article which is light in weight and excellent in both fusion bondability and surface properties. In particular, in a molded article having partiality in thickness, it was difficult to make both fusion bondability and surface properties compatible with each other.

In view of the foregoing purposes, the present inventors paid attention to an expanded beads molded article containing a crosslinked polymer obtained by crosslinking an ethylene/α-olefin multi-block copolymer and made extensive and intensive investigations. As a result, it has been found that the aforementioned problem can be solved by adopting the following constitution, thereby leading to accomplishment of the present invention.

Specifically, the present invention is as follows.

[1] An expanded beads molded article of expanded beads comprising a crosslinked multi-block copolymer containing a polyethylene block and an ethylene/α-olefin copolymer block, wherein a density of the expanded beads molded article is from 40 to 150 g/L; a gel fraction of the expanded beads molded article by a hot xylene extraction method is from 30 to 70% by weight; a tensile elongation of the expanded beads molded article is 120% or more; a bead weight of the expanded beads is from 0.8 to 8 mg; and the number of expanded beads per unit area on a surface of the expanded beads molded article is from 5 to 30 per cm$^2$.

[2] The expanded beads molded article as set forth in the above [1], wherein an average cell diameter of the expanded beads molded article is from 50 to 200 μm.

[3] The expanded beads molded article as set forth in the above [1] or [2], wherein the bead weight of the expanded beads is from 1 to 4 mg.

[4] The expanded beads molded article as set forth in any one of the above [1] to [3], wherein a type C durometer hardness of a molded article surface of the expanded beads molded article is from 15 to 50.

[5] The expanded beads molded article as set forth in any one of the above [1] to [4], wherein the expanded beads molded article has a thin-walled part having a minimum thickness of 5 mm or less.

[6] The expanded beads molded article as set forth in any one of the above [1] to [5], wherein the multi-block copolymer is a multi-block copolymer containing a polyethylene block and an ethylene/1-octene copolymer block.

The expanded beads molded article of the present invention is an expanded beads molded article containing a crosslinked multi-block copolymer containing a polyethylene block and an ethylene/α-olefin copolymer block, and in view of the fact that a density of the expanded beads molded article is 40 to 150 g/L; a tensile elongation of the expanded beads molded article is 120% or more; a gel fraction of the expanded beads molded article by a hot xylene extraction method is 30 to 70% by weight; a bead weight of the expanded beads is 0.8 to 8 mg; and the number of expanded beads per unit area on a surface of the expanded beads molded article is 5 to 30 per cm$^2$, it is possible to provide an expanded beads molded article which is excellent in surface properties and fusion bondability and also excellent in durability.

DESCRIPTION OF EMBODIMENTS

The expanded beads molded article of the present invention is an in-mold expanded beads molded article of expanded beads containing a crosslinked multi-block copolymer containing a polyethylene block and an ethylene/α-olefin copolymer block, wherein a density of the expanded beads molded article is 40 to 150 g/L; a gel fraction of the expanded beads molded article by a hot xylene extraction method is 30 to 70% by weight; a tensile elongation of the expanded beads molded article is 120% or more; a bead weight of the expanded beads is 0.8 to 8 mg; and the number of expanded beads per unit area on a surface of the expanded beads molded article is 5 to 30 per cm$^2$.

The expanded beads constituting the expanded beads molded article of the present invention and the expanded beads molded article are hereunder described in detail.

[Expanded Beads]

The expanded beads constituting the expanded beads molded article of the present invention are expanded beads containing a crosslinked multi-block copolymer containing a polyethylene block and an ethylene/α-olefin copolymer block (hereinafter also referred to simply as "multi-block copolymer").

(Multi-Block Copolymer)

The multi-block copolymer has a polyethylene block and an ethylene/α-olefin copolymer block. The multi-block copolymer can be, for example, represented by the following formula (1).

$$(AB)_n \tag{1}$$

In the formula, n is an integer of 1 or more; A represents a hard block; and B represents a soft block.

The hard block of A (hereinafter also referred to as "A block") is corresponding to the polyethylene block, and the soft block of B (hereinafter also referred to as "B block") is corresponding to the ethylene/α-olefin copolymer block. It is preferred that the A block and the B block are linearly configured. Furthermore, it is preferred that the multi-block copolymer does not contain a third block other than the A block and the B block.

A proportion of a component of a structural unit derived from ethylene in the polyethylene block constituting the A block is preferably more than 95% by weight, and more preferably more than 98% by weight relative to the mass of the polyethylene block. Meanwhile, in the ethylene/α-olefin copolymer block constituting the B block, a proportion of a component of a structural unit derived from the α-olefin is preferably more than 5% by weight, more preferably more than 10% by weight, and still more preferably more than 15% by weight relative to the mass of the ethylene/α-olefin copolymer block.

An upper limit of the proportion of the ethylene/α-olefin copolymer block constituting the B block in the multi-block copolymer is preferably 99% by weight, and more preferably 95% by weight relative to the mass of the multi-block copolymer. A lower limit of the foregoing proportion is preferably 1% by weight, and more preferably 5% by weight relative to the mass of the multi-block copolymer. The proportion of the polyethylene block and the proportion of the ethylene/α-olefin copolymer block can be calculated on a basis of data obtained by means of differential scanning colorimetry (DSC) or nuclear magnetic resonance (NMR).

The ethylene/α-olefin copolymer block constituting the B block in the multi-block copolymer is preferably a block of a copolymer of a $C_3$-$C_{20}$ α-olefin and ethylene. In the ethylene/α-olefin copolymer block, examples of the α-olefin which is copolymerized with ethylene include propylene, 1-butene, 1-pentene, 1-hexene, 1-heptene, 1-octene, 1-nonene, 1-decene, 3-methyl-1-butene, and 4-methyl-1-pentene, and these can be used in combination. From the viewpoints of easiness of industrial availability, various characteristics, economy, and so on, examples of the α-olefin which is copolymerized with ethylene include propylene, 1-butene, 1-hexene, and 1-octene, with 1-octene being especially preferred.

Examples of the multi-block copolymer include the ethylene/α-olefin copolymer described in PTL 1. Examples of the commercially available products of the multi-block copolymer include "INFUSE", a trade name, manufactured by The Dow Chemical Company.

The ethylene/α-olefin copolymer can be produced by using a known polymerization method using a known catalyst for olefin polymerization.

(Characteristics of Multi-Block Copolymer)

An upper limit of a melt flow rate at 190° C. and a load of 2.16 kg of the multi-block copolymer can be selected from a range of preferably 10 g/10 min, more preferably 8 g/10 min, and still more preferably 7 g/10 min. In addition, a lower limit of the foregoing melt flow rate can be selected from a range of preferably 2 g/10 min, more preferably 3 g/10 min, and still more preferably 4 g/10 min. When the melt flow rate falls within the aforementioned range, the fusion bondability of the expanded beads containing the multi-block copolymer are favorable, and the restorability of the expanded beads molded article is also excellent. This melt flow rate is a value of the multi-block copolymer before a crosslinking step as mentioned later, which is measured under a condition at a temperature of 190° C. and a load of 2.16 kg in conformity with JIS K7210-1 (2014).

An upper limit of a density of the multi-block copolymer is preferably 1,000 g/L, and more preferably 900 g/L. In addition, a lower limit of the density of the multi-block copolymer is preferably 700 g/L, and more preferably 800 g/L.

An upper limit of a melting point of the multi-block copolymer is preferably 150° C., and more preferably 140° C. In addition, a lower limit of the melting point of the multi-block copolymer is preferably 110° C., and more preferably 115° C. When the melting point of the multi-block copolymer falls within the aforementioned range, a compression set at a high temperature can be made small. The melting point of the multi-block copolymer can be determined on a basis of the heat flux differential scanning calorimetry described in JIS K7121 (1987) in such a manner that the multi-block copolymer is heated from 30° C. to 200° C. at a temperature rise rate of 10° C./min, then cooled to 30° C. at a cooling rate of 10° C./min, and again heated from 30° C. to 200° C. at a temperature rise rate of 10° C./min to provide a DSC curve, and the melting point is obtained from a peak temperature of an endothermic peak determined by the DSC curve. In the case where plural endothermic peaks appear in the DSC curve for the aforementioned second heating, the peak temperature of the endothermic peak having a largest area is designated as the melting point.

An upper limit of a flexural modulus of the multi-block copolymer is preferably 100 MPa, more preferably 50 MPa, and still more preferably 40 MPa. In addition, a lower limit of the flexural modulus of the multi-block copolymer is preferably 10 MPa, more preferably 12 MPa, and still more preferably 15 MPa. The flexural modulus of the multi-block copolymer is a value measured in conformity with the measurement method described in JIS K7171 (2008).

(Additional Additive)

In the multi-block copolymer, an additional additive can be added within a range where the object and effects of the present invention are not impaired. Examples of the additional additive include an antioxidant, an ultraviolet ray inhibitor, an antistatic agent, a flame retardant, a flame retarding assistant, a metal deactivator, a conductive filler, and a cell controlling agent.

A total amount of these additives is preferably 20 parts by weight or less, more preferably 10 parts by weight or less, and still more preferably 5 parts by weight or less based on 100 parts by weight of the multi-block copolymer. The additives are generally used in the requisite minimum amounts. In addition, these additives can be contained in polymer particles in such a manner that on the occasion of producing the polymer particles, the additives are added and kneaded in an extruder together with the multi-block copolymer.

The multi-block copolymer may contain an additional polymer other than the multi-block copolymer within a range where the object and effects of the present invention are not impaired. Examples of the additional polymer other than the multi-block copolymer include a thermoplastic resin, such as a polyolefin-based resin (for example, a polyethylene-based resin, a polypropylene-based resin, and a polybutene-based resin) and a polystyrene-based resin; a thermoplastic elastomer (for example, polybutadiene, polyisoprene, an ethylene-propylene copolymer, an ethylene-propylene-diene copolymer, and styrene-butadiene, styrene-isoprene, styrene-butadiene-styrene, and styrene-isoprene-styrene block copolymers and hydrogenated products thereof); and a dynamically crosslinked elastomer (such as an ethylene-propylene rubber (EPM) and an ethylene-propylene-diene terpolymer (EPDM)). A blending proportion of the additional polymer is preferably 10 parts by weight or less, and more preferably 5 parts by weight or less based on 100 parts by weight of the multi-block copolymer, and it is especially preferred that the multi-block copolymer is composed of only the multi-block copolymer.

(Bead Weight of Expanded Beads)

A bead weight of the expanded beads constituting the expanded beads molded article of the present invention (hereinafter sometimes referred to simply as "expanded beads") is 0.8 to 8 mg. When the bead weight of the expanded beads is too small, there is a concern that a sufficient cell structure is not formed within the expanded beads, or a specific surface area of the expanded beads becomes larger, so that a gas is liable to dissipate from the interior of the cell. In addition, when the expanded beads are subjected to in-mold molding, a secondary expansion force of the expanded beads per se is lowered, so that the expanded beads are hardly secondarily expanded. Thus, there is a concern that it is difficult to obtain an expanded beads molded article which is high in tensile elongation and excellent in fusion bondability of the expanded beads each other. In addition, the resulting molded article significantly contracts, and therefore, the resulting molding is inferior in mold shaping properties. From such a viewpoint, a lower limit of the bead weight of the expanded beads is 0.8 mg, and preferably 1 mg. On the other hand, when the bead weight of the expanded beads is too large, though the secondary expandability of the expanded beads is improved, the expanded beads are hardly filled in a mold, and therefore, there is a concern that the surface properties of the expanded beads molded article are lowered. From such a viewpoint, an upper limit of the bead weight of the expanded beads is 8 mg, preferably 5 mg, more preferably 4 mg, and still more preferably 3 mg.

The bead weight is obtained by randomly selecting 100 beads and gathering the selected 100 beads to measure their mass [mg]. Then, a value is calculated by dividing the measured mass by 100 and defined as an average bead weight [mg]. The expanded beads having a bead weight of approximately 0.8 to 4 mg are obtained by mainly obtaining polymer particles having a small particle weight by an underwater cutting method and crosslinking and expanding these polymer particles. In particular, the expanded beads having a bead weight of 0.8 to 4 mg are excellent in secondary expandability. Furthermore, by using the foregoing expanded beads and allowing a gap between the expanded beads in a mold to fall within a specified range, a heating medium is well diffused within the mold at the time of in-mold molding. In consequence, since the in-mold moldability of the expanded beads becomes favorable, the resulting expanded beads molded article is excellent in fusion bondability, and further, the expanded beads molded article is excellent in both tensile elongation and tensile strength and excellent in durability.

(Tensile Elongation of Expanded Beads Molded Article)

The expanded beads molded article of the present invention is required to have a tensile elongation of 120% or more.

The expanded beads molded article of the present invention is especially excellent in durability. When the tensile elongation is 120% or more, the fusion bondability of the expanded beads of the expanded beads molded article is favorable, and in particular, it is suggested that the fusion bonding extends to a group of the expanded beads in the interior of the molded article. In consequence, the molded article can be applied to purposes including a seat cushioning material, a pad material for sporting, a shoe sole material, and the like. From the aforementioned viewpoint, the tensile elongation of the expanded beads molded article is preferably 130% or more, and more preferably 150% or more. An upper limit of the tensile elongation of the expanded beads molded article is generally 500%, preferably 400%, and more preferably 300%.

(Density of Expanded Beads Molded Article: Molded Article Density)

An upper limit of a density of the expanded beads molded article (molded article density) of the present invention is 150 g/L, preferably 145 g/L, more preferably 140 g/L, and still more preferably 130 g/L. In addition, a lower limit of the molded article density is 40 g/L, preferably 40 g/L, more preferably 45 g/L, and still more preferably 50 g/L. When the density of the expanded beads molded article falls within the aforementioned range, an expanded beads molded article with excellent lightweight properties and flexibility is revealed. The density (g/L) of the expanded beads molded article is determined by diving a mass W (g) of the molded article by a volume V (L) of the molded article (W/V). The volume V of the expanded beads molded article can be measured by a water immersion method.

(Gel Fraction of Expanded Beads Molded Article by Hot Xylene Extraction Method)

In the expanded beads molded article of the present invention, a gel fraction of the expanded beads molded article by a hot xylene extraction method is 30 to 70% by weight. When the gel fraction is less than 30% by weight, the expanded beads molded article significantly contracts, so that it is difficult to produce an expanded beads molded article with excellent surface properties, or shaping properties for obtaining a desired mold shape is inferior. In addition, an expanded beads molded article obtained by subjecting the expanded beads to in-mold molding becomes worsened in restorability, so that desired physical properties are hardly obtained. On the other hand, when the gel fraction is more than 70% by weight, the fusion bondability of the expanded beads each other becomes low, so that it is difficult to produce an expanded beads molded article with excellent durability. From the aforementioned viewpoints, an upper limit of the gel fraction of the expanded beads is preferably 60% by weight, and more preferably 55% by weight. A lower limit of the gel fraction of the expanded beads is preferably 35% by weight, and more preferably 40% by weight. In the present invention, the gel fraction is one of indices exhibiting the crosslinked state of the resin expanded article and can be measured by the following method.

The gel fraction can be controlled by the addition amount of a crosslinking agent as mentioned later, and can also be controlled by an agitation condition, a temperature rise condition, and the like on the occasion of crosslinking the polymer particles in a closed vessel.

The gel fraction by the hot xylene extraction method can be measured by the following method. First of all, approximately 0.7 g of a test piece resulting from cutting a part of the expanded beads molded article is weighed and designated as a sample weight W1, the weighed test piece is put into a 150-mL round bottom flask, and 100 mL of xylene is added in the round bottom flask, followed by heating for refluxing with a mantle heater for 6 hours. Thereafter, a residue left undissolved in the round bottom flask is filtered with a 100-mesh metallic mesh and separated, and then dried with a vacuum drier at 80° C. for 8 hours or more. A weight W2 of the resulting dry product obtained on this occasion is measured. A weight percentage of this weight W2 to the sample weight W1 [(W2/W1)×100] (%) is defined as the gel fraction.

The gel fraction of the expanded beads constituting the expanded beads molded article can be measured by the same method while using the expanded beads as a sample. At the time of in-mold molding, since the gel fraction does not change, the values of gel fraction of the expanded beads and the expanded beads molded article are substantially identical with each other.

(Number of Expanded Beads on Surface of Expanded Beads Molded Article)

In the expanded beads molded article of the present invention, the number of expanded beads per unit area on a surface of the expanded beads molded article is 5 to 30 per $cm^2$. The number of expanded beads per unit area is more than 30 per $cm^2$, a gap between the expanded beads in a state of being filled in a molding cavity becomes small. Then, on the occasion when a group of the expanded beads is heated by a heating medium, such as steam, at the time of in-mold molding, and the expanded beads are secondarily expanded, whereby the gap between the expanded beads is filled up, the gap between the expanded beads of a surface portion of the molded article is filled up at an early stage after commencement of heating with the heating medium. Accordingly, the heating medium is not thoroughly fed into a group of the expanded beads in the interior of the mold, so that the expanded beads existent in a central part of the molding cavity are hardly secondarily expanded. In consequence, the resulting molded article is liable to become in a state that the expanded beads in the interior of the molded article are not fusion-bonded, so that there is a concern that the tensile elongation of the expanded beads molded article is lowered. On the other hand, in the case where the aforementioned number is less than 5 per $cm^2$, curved surfaces of the expanded beads are liable to remain in a molded article edge portion or corner part of the expanded beads molded article produced by in-mold molding of the expanded beads. In addition, there is a concern that voids formed on the surface of the expanded beads molded article increase, or the surface properties or shaping properties are lowered. From the aforementioned viewpoints, an upper limit of the foregoing number is preferably 20 per $cm^2$, and more preferably 18 per $cm^2$. A lower limit of the foregoing number is 6 per $cm^2$, and more preferably 10 per $cm^2$.

In the present invention, by not only using expanded beads having a specified bead weight and having excellent filling properties and secondary expansion force but also allowing the number of expanded beads on a surface of the molded article to fall within a specified range to control the in-mold moldability, an expanded beads molded article with excellent internal fusion bondability and surface properties is obtained. In particular, by using expanded beads having a specified weight and allowing the number of expanded beads on a surface of the molded article to fall within a specified range, even in the case of altering a molding condition of cracking, etc. to change a thickness of the molded article, it becomes possible to improve the secondary expandability of the expanded beads in a wide molding range. In consequence, an expanded beads molded article with excellent surface properties and fusion bondability is obtained without being influenced by the partiality in thickness of the molded article.

(Measurement Method of Number of Expanded Beads on Surface of Expanded Beads Molded Article)

In the present invention, the number of expanded beads is measured by the following method.

In five or more places of the surface of a portion of the expanded beads molded article exclusive of an edge portion thereof, the number of expanded beads existent within a range of a regular square of 100 mm×100 mm is counted. The number of expanded beads is calculated by expressing this value in terms of a value per unit area ($cm^2$). With respect to cells existent on the line of the aforementioned range, only the expanded beads intersecting adjacent two sides to each other are counted, and the expanded beads intersecting other two sides are not counted. For example, in a regular square of 100 mm×100 mm, in the case of counting the left-hand side and lower side sides, the upper side and right-hand side sides are not counted.

(Average Cell Diameter of Expanded Beads Molded Article)

In the expanded beads molded article of the present invention, an upper limit of an average cell diameter (a) of the molded article is preferably 200 μm, more preferably 180 μm, and still more preferably 150 μm. In addition, a lower limit of the average cell diameter (a) of the molded article is preferably 50 μm, more preferably 60 μm, and still more preferably 70 μm. When the average cell diameter falls within the aforementioned range, a favorable expanded beads molded article is obtained without causing a lowering of compression physical properties of the expanded beads molded article.

(Measurement of Average Cell Diameter of Expanded Beads Molded Article)

In the present invention, the aforementioned average cell diameter of the expanded beads molded article is measured on a basis of ASTM D3576-77 as follows.

A cut surface obtained by dividing a central part of the expanded beads molded article into approximately two parts is photographed with a scanning electron microscope. In the resulting cross-sectional photograph, a straight line is drawn at equal intervals in the thickness direction and the width direction from the vicinity of the center of the cut surface in the molded article, and the number of all cells intersecting the straight line is counted. A value obtained by dividing a total length of the straight lines by the number of cells counted is defined as an average chord length of cell. A value obtained by dividing the foregoing average chord length by 0.616 is defined as a cell diameter of the expanded beads molded article. This operation is performed in at least 10 places, and an arithmetic average value of the cell diameter of each of the expanded beads molded articles is defined as the average cell diameter.

(Surface Hardness of Expanded Beads Molded Article)

Furthermore, a surface hardness of the expanded beads molded article of the present invention is preferably 15 to 50 in terms of a type C durometer hardness. When the type C durometer hardness falls within this range, an expanded beads molded article provided with characteristics rich in cushioning property and elastic recovery can be revealed.

(Minimum Thickness of Expanded Beads Molded Article)

Even in the case where a thickness of the whole of the expanded beads molded article is thin-walled, the expanded beads molded article of the present invention has favorable fusion bondability and surface properties. In addition, even the molded article is an expanded molded article having partially a thin-walled part having a minimum thickness of 5 mm or less, and preferably 3 mm to 5 mm, an expanded beads molded article having uniform and excellent surface properties can be revealed.

(Tensile Strength of Expanded Beads Molded Article)

A tensile strength of the expanded beads molded article of the present invention is preferably 0.3 MPa or more. The expanded beads molded article obtained by the present invention is a molded article in which the expanded beads are firmly fusion-bonded to each other in the interior of the molded article, and the tensile physical properties of the molded article are especially improved. When the tensile strength is 0.3 MPa or more, it is suggested that the fusion bondability of the expanded beads of the expanded beads molded article is favorable, and the expanded beads molded article is excellent in durability and can be applied to purposes including a seat cushioning material, a pad material for sporting, a shoe sole material, and the like. From the aforementioned viewpoint, the tensile strength of the expanded beads molded article is more preferably 0.4 MPa or more, still more preferably 0.5 MPa or more, and especially preferably 0.6 MPa or more. An upper limit of the tensile strength of the expanded beads molded article is generally 1 MPa, and preferably 0.9 MPa.

The expanded beads which are used in the present invention can be produced by a process (B) including steps of crosslinking of non-expanded beads obtained by steps of kneading and granulation of a multi-block copolymer, or the like as shown in a process (A) mentioned later, impregnation of a blowing agent, and expansion.

[Process (A): Steps of Kneading and Granulation of Multi-Block Copolymer]

Multi-block copolymer particles (hereinafter sometimes referred to as "polymer particles") are produced by a known method, such as a method in which the multi-block copolymer is fed into an extruder and kneaded to form a molten kneaded material, the molten kneaded material is extruded into a strand form from the extruder, and the strand is cut into a size suitable for forming the expanded beads. For example, the polymer particles of a target bead weight can be obtained in such a manner that in the aforementioned method, the molten kneaded material having been extrusion-molded in a strand form is cooled by means of water cooling, and then cut into a predetermined length.

In view of the fact that the molten kneaded material of the multi-block copolymer is soft, in the case of adopting a strand cutting method, there is a concern that the error of cutting or chip is liable to be generated. From the viewpoint of making the particles smaller, it is preferred to adopt an underwater cutting method (UWC), in which the molten kneaded material is cut in water.

An average weight per one polymer particle is 0.8 to 8 mg. The polymer particles may contain known additives, such as a flame retardant, a flame retarding assistant, a plasticizer, an antistatic agent, an antioxidant, an ultraviolet ray inhibitor, a photostabilizer, a conductive filler, and an antibacterial agent. Such an additive can be added in a step of obtaining the polymer particles at the time of kneading of the process (A).

To the polymer particles, a cell controlling agent (also referred to as "foam nucleating agent" or "nucleating agent") can be added. Examples of the cell controlling agent include an inorganic material, such as talc, mica, zinc borate, calcium carbonate, silica, titanium oxide, gypsum, zeolite, borax, aluminum hydroxide, and carbon, and besides, an organic nucleating agent, such as a phosphoric acid-based nucleating agent, a phenol-based nucleating agent, an amine-based nucleating agent, and a polyethylene fluoride-based resin powder, e.g., polytetrafluoroethylene (PTFE). The cell controlling agent can be contained in the polymer particles by feeding into an extruder in the step of obtaining the polymer particles. A proportion of the cell controlling agent in the polymer particles is preferably 0.01 to 1 part by weight based on 100 parts by weight of the multi-block copolymer.

An average particle diameter of the cell controlling agent is preferably 0.01 to 50 μm, and more preferably 0.1 to 30 μm. The average particle diameter can be measured by a centrifugal sedimentation particle size measurement method.

As for the expanded beads which are used in the present invention, expanded beads having target average cell diameter and average surface layer thickness can be obtained by changing a foaming condition, such as the kind and addition amount of the cell controlling agent, a foaming method, a foaming temperature, the amount of a blowing agent, and a foaming atmosphere, and characteristics of the resin, or other means. For example, when the addition amount of the cell controlling agent (foaming nucleating agent) is increased, the amount of the foaming nucleus increases, and therefore, there is a tendency that the cell becomes small, and the cell film thickness becomes thin. When As for a cell controlling agent containing a hydrate, such as zinc borate, hydrated water acts on the foaming, and therefore, there is a tendency that the cell diameter becomes large.

[Process (B): Steps of Crosslinking of Polymer Particles, Impregnation of Blowing Agent, and Expansion]

In the process (B), the polymer particles are dispersed together with a crosslinking agent in a dispersing medium, such as water, in a closed vessel, the dispersion is heated under agitation to soften and crosslink the polymer particles, and a blowing agent is then impregnated in the polymer particles to obtain expandable crosslinked particles. Thereafter, the expandable crosslinked particles are expanded to obtain expanded beads.

(Dispersing Medium)

The dispersing medium to be used for production of expanded beads which are used for the expanded beads molded article of the present invention is not particularly limited so long as it is a dispersing medium which does not dissolve the polymer particles therein. Examples of the dispersing medium include water, ethylene glycol, glycerin, methanol, and ethanol. The dispersing medium is preferably water.

(Dispersion)

The polymer particles are dispersed in the dispersing medium. For example, the polymer particles are dispersed in the dispersing medium by using an agitator.

In the process (B), a dispersant may be further added to the dispersing medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. In addition, a surfactant can be further added to the dispersing medium. Examples of the surfactant include sodium oleate and sodium dodecylbenzenesulfonate, and also include an anionic surfactant and a nonionic surfactant that are generally used in suspension polymerization.

(Closed Vessel)

The closed vessel used in the process (B) is not particularly limited so long as the vessel can be closed air-tightly. In the process (B), the copolymer particles are heated, and the pressure inside the closed vessel increases, and therefore, the closed vessel necessarily withstands the increase of the pressure in the process (B). The closed vessel is, for example, an autoclave.

(Crosslinking Agent and Crosslinking)

In the process (B), a crosslinking agent can be used for the purpose of crosslinking the polymer particles. The crosslinking agent may be added to the dispersing medium in advance, and may also be added to the dispersing medium after dispersing the polymer particles in the dispersing medium. The crosslinking agent is not particularly limited so long as it is able to crosslink the multi-block copolymer. As the crosslinking agent, a conventionally known organic peroxide which is used for crosslinking a polyethylene-based resin can be used. Examples thereof include a Percumyl-based compound, such as dicumyl peroxide and tert-butylcumyl peroxide; a Perbutyl-based compound, such as 1,1-bis(tert-butylperoxy)-3,3,5-trimethylcyclohexane, 2,5-dimethyl-2,5-di(tert-butylperoxy)hexane, and di-tert-butyl peroxide; a Perhexyl-based compound, such as tert-hexylperoxybenzoate; and a Perocta-based compound, such as 1,1,3,3-tetramethylbutylperoxy-2-ethylhexanoate. Of these, a Percumyl-based compound and a Perbutyl-based compound are preferred, and dicumyl peroxide is more preferred. These can be used either alone or in combination of two or more thereof. An upper limit of the blending amount of the crosslinking agent is preferably 3.0 parts by weight, and more preferably 2.5 parts by weight based on 100 parts by weight of the multi-block copolymer (polymer particles). A lower limit of the blending amount of the crosslinking agent is preferably 0.1 part by weight, and more preferably 0.2 part by weight based on 100 parts by weight of the multi-block copolymer (polymer particles).

When the blending amount of the crosslinking agent falls within the aforementioned range, the multi-block copolymer constituting the polymer particles is crosslinked, whereby crosslinked particles having an appropriate gel fraction are obtained. Not only the crosslinked particles can be thoroughly expanded, but also on the occasion of expansion, the cell wall forming a cell can thoroughly withstand the expansion.

It is preferred that the crosslinking reaction is performed at a temperature equal to or higher than a temperature at which the multi-block copolymer constituting the polymer particles having been dispersed in the dispersion medium is softened, and the crosslinking agent is substantially decomposed, specifically at a temperature equal to or higher than not only a one-hour half-life temperature of the organic peroxide but also a melting point of the multi-block copolymer. The crosslinking reaction is preferably performed while holding at this temperature for 1 minute to 200 minutes.

(Expansion)

It is preferred that a blowing agent for expanding the crosslinked particles obtained by crosslinking the polymer particles is added to the dispersing medium in the closed vessel, and the blowing agent is then impregnated in the crosslinked particles in a softened state. Although a temperature for impregnating the blowing agent (impregnation temperature) is not particularly limited so long as it is a temperature equal to or higher than a temperature at which the crosslinked particles become in a softened state, for example, an upper limit of the impregnation temperature is preferably 180° C., more preferably 170° C., and still more preferably 165° C. In addition, a lower limit of the impregnation temperature is preferably 100° C., more preferably 130° C., and still more preferably 140° C.

(Blowing Agent)

The blowing agent to be used is not particularly limited so long as it is able to expand the crosslinked particles. Examples of the blowing agent include an inorganic physical blowing agent, such as air, nitrogen, carbon dioxide, argon, helium, oxygen, and neon; and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred because it does not deplete the ozone layer and is inexpensive; nitrogen, air, and carbon dioxide are more preferred; and carbon dioxide is especially preferred. These blowing agents can be used either alone or in combination of two or more thereof. Although the blending amount of the blowing agent is determined in consideration of an apparent density of the target expanded beads, the kind of the multi-block copolymer, the kind of the blowing agent, and the like, in general, it is preferred to use 2 to 20 parts by weight of the organic physical blowing agent, or to use 0.5 to 20 parts by weight of the inorganic physical blowing agent, based on 100 parts by weight of the multi-block copolymer. The aforementioned steps of crosslinking, impregnation, and expanding are preferably performed as a series of steps in the same closed vessel.

(Production of Expanded Beads)

The expandable crosslinked particles having been impregnated with the blowing agent and heated are released to an atmosphere having a pressure that is lower than the pressure within the closed vessel, to produce expanded beads. Specifically, while holding the pressure in the closed vessel at a pressure equal to or higher than a vapor pressure of the blowing agent, one end of the closed vessel under the water surface is opened to release the expandable crosslinked particles containing the blowing agent together with the dispersing medium from the interior of the closed vessel to an atmosphere having a pressure that is lower than the pressure in the closed vessel, generally to an atmospheric pressure, thereby expanding the expandable crosslinked particles (referred to as "direct expansion method"). According to this method, the expanded beads are produced.

As the production method of the expanded beads, while the method of undergoing the production in a closed vessel has been described above, the production method of the expanded beads is not limited to the aforementioned production method. For example, a method in which the multi-block copolymer, the crosslinking agent, and the blowing agent are fed into an extruder and melted to crosslink the multi-block copolymer, and the crosslinked multi-block copolymer is then extruded and expanded from a mold installed in an apex of the extruder and further cooled, followed by pelletization for cutting in a bead form, to form expanded beads; and a method in which the expandable crosslinked particles obtained through the aforementioned processes (A) to (B) are taken out from the closed vessel, and dehydrated for drying, and the expandable crosslinked particles are then heated for expansion with a heating medium to form the expanded beads may be adopted.

Furthermore, while the method of crosslinking the polymer particles with an organic peroxide has been described above, the crosslinking treatment in the present invention is not limited to the use of an organic peroxide, and other known methods can also be used, for example, the crosslinked particles or the expanded crosslinked beads can be obtained through a crosslinking treatment using an electron beam crosslinking method or the like.

By attaching an anionic surfactant to the surfaces of the expanded beads which are used for the expanded beads molded article of the present invention, the fusion bondability at the time of in-mold molding can be improved. Examples of the anionic surfactant include a carboxylic acid type, a sulfonic acid type, a sulfate ester type, a phosphate ester type, and a polymer type. In particular, among the aforementioned anionic surfactants, an alkanesulfonate salt, a polyacrylate salt, or a salt of a polyacrylic acid-sulfonic acid copolymer is preferably attached to the surfaces of the expanded beads because expanded beads which are excellent in an effect for improving the fusion bondability at the time of in-mold molding are obtained. In addition, the anionic surfactant can be used either alone or in admixture of two or more thereof.

An attached amount of the anionic surfactant to the expanded beads per unit surface area is preferably 2 mg/m$^2$ or more, more preferably 5 mg/m$^2$ or more, and especially preferably 20 mg/m$^2$ or more. On the other hand, an upper limit of the foregoing attached amount per unit surface area is generally 100 mg/m$^2$ or less. In addition, as for a coated amount of the anionic surfactant onto the expanded beads, a value obtained through calculation on a basis of a value measured with a TOC (total organic carbon) measuring device can be adopted. In the present invention, the measurement of TOC was performed with a total organic carbon analyzer, manufactured by Shimadzu Corporation (a trade name: TOC-VCSH). Since a total carbon (TC) in water is composed of total organic carbon (TOC) and inorganic carbon (IC) that is a carbon component, there is a relation of TC=TOC plus IC, and thus, TOC=TC minus IC. Accordingly, TOC can be determined by the TC–IC method.

(Average Cell Diameter of Expanded Beads)

In the expanded beads which are used in the present invention, an upper limit of the average cell diameter (a) can be set to 200 μm and is more preferably 180 μm, and still more preferably 160 μm. A lower limit of the average cell diameter (a) can be set to 50 μm and is more preferably 60 μm, and still more preferably 70 μm. When the average cell diameter falls within the aforementioned range, the cells are neither broken nor converted into open cells at the time of molding, and fusion bondability is not lowered, so that a favorable expanded beads molded article is obtained.

The average cell diameter is obtained in the following manner. First of all, a cut surface obtained by dividing a central part of the expanded beads molded article into approximately two parts is photographed with a scanning electron microscope. Subsequently, in the resulting cross-sectional photograph, a straight line is drawn at equal intervals in the eight directions from the vicinity of the center of the cut surface in the expanded bead, and the number of all cells intersecting the straight line is counted. A value obtained by dividing a total length of the straight lines by the number of cells counted is defined as an average chord length of cell. A value obtained by dividing the foregoing average chord length by 0.616 is defined as a cell diameter of the expanded bead. This operation is performed in at least 10 places, and an arithmetic average value of the cell diameter of each of the expanded beads is defined as the average cell diameter.

(Apparent Density, Bulk Density, and Average Bead Diameter of Expanded Beads)

An upper limit of an apparent density of the expanded beads which are used for the expanded beads molded article of the present invention is preferably 200 g/L, more preferably 180 g/L, and still more preferably 160 g/L. In addition, a lower limit of the apparent density of the expanded beads is preferably 50 g/L, more preferably 55 g/L, and still more preferably 60 g/L. By allowing the apparent density of the expanded beads to fall within the aforementioned range, an expanded beads molded article having a target density of the molded article is obtained.

The apparent density can be determined by preparing a measuring cylinder having ethanol charged therein, immersing 500 or more of the expanded beads (weight of a group of the expanded beads: Wt) in the measuring cylinder by using a metallic mesh or the like, and dividing the weight of the group of the expanded beads charged in the measuring cylinder by a volume of the expanded beads read from an elevation of the liquid level of ethanol.

An upper limit (g/L) of a bulk density of the expanded breads which are used for the expanded beads molded article of the present invention is preferably 125 g/L, more preferably 110 g/L, and still more preferably 100 g/L. In addition, a lower limit (g/L) of the bulk density is preferably 30 g/L, more preferably 33 g/L, and still more preferably 35 g/L. A measurement method of the bulk density (g/L) as referred to in the present invention is as follows. First of all, a vacant measuring cylinder is prepared, and 500 or more of the expanded beads are charged in the measuring cylinder. The bulk density can be determined by dividing the weight of a group of the expanded beads charged in the measuring cylinder by a volume expressed by a scale of the measuring cylinder at this time.

An upper limit of an average bead diameter of the expanded beads which are used in the present invention is preferably 6 mm, and more preferably 5 mm. In addition, a lower limit of the average bead diameter is preferably 0.5 mm, and more preferably 1 mm. When the average bead diameter of the expanded beads falls within the aforementioned range, not only the production of expanded beads is easy, but also when the expanded beads are subjected to in-mold molding, it becomes easy to fill the expanded beads within a mold. The average bead diameter of the expanded beads can be controlled by regulating the amount of the blowing agent, the expansion condition, the particle diameter of the polymer particles, and the like. The average bead diameter of the expanded beads is obtained by measuring a maximum diameter of each of 100 arbitrary expanded beads and expressing an average value of the calculated values as an average bead diameter of the expanded beads.

[Expanded Beads Molded Article]

The expanded beads molded article of the present invention can be obtained by subjecting expanded beads containing a crosslinked multi-block copolymer containing a polyethylene block and an ethylene/α-olefin copolymer block to in-mold molding.

(In-Mold Molding)

The expanded beads molded article can be obtained by filling the expanded beads in a mold and heating with a heating medium, such as steam, for molding, according to a conventionally known method. Specifically, the expanded beads are filled in a mold, and the expanded beads are then heated and expanded by introducing a heating medium, such as steam, into the mold, to subject the expanded beads to fusion bonding to each other, whereby the expanded beads molded article in which the shape of a molding space within the mold can be obtained. In addition, the in-mold molding in the present invention is preferably performed by a pressure molding method (see, for example, JP 51-22951 B) in which the expanded beads are subjected in advance to a pressure treatment with a pressurized gas, such as air, to increase the pressure inside the expanded beads for controlling the pressure inside the expanded beads to 0.01 to 0.2 MPa(G) (G means the gauge pressure); the expanded beads are then filled in a cavity of a mold under an atmospheric pressure or reduced pressure, followed by closing the mold; and subsequently, a heating medium, such as steam, is introduced into the mold for molding the expanded beads through fusion bonding thereof with heat. In addition, the in-mold molding can be performed by a compression filling molding method (see JP 4-46217 B) in which a cavity pressurized with a compressed gas to an atmospheric pressure or more is filled with expanded beads pressurized to the foregoing pressure or more; and a heating medium, such as steam, is then introduced into the cavity for heating, thereby molding the expanded beads through fusion bonding thereof with heat. Besides, the in-mold molding can also be performed by an ambient pressure filling molding method (see JP 6-49795 B) in which expanded beads obtained under a special condition and having a high secondary expansion force are filled in a cavity of a mold of a male and female pair under an atmospheric pressure or reduced pressure; and a heating medium, such as steam, is then fed thereinto for heating, thereby molding the expanded beads through fusion bonding thereof with heat, or a method through a combination of the aforementioned methods (see JP 6-22919 B), or the like.

In the specific in-mold molding of the expanded beads molded article of the present invention, in the case of filling the expanded beads such that a ratio of cracking in the mold is 10 to 250% by volume, and preferably 15 to 220% by volume, in view of the fact that the specified weight of expanded beads and number of expanded beads on the surface of the molded article are satisfied, an expanded beads molded article satisfying both the fusion bondability and surface properties can be obtained. In particular, in the case of obtaining a molded article having a thin thickness, it is preferred to control the ratio of cracking to 100% by volume or more.

On the occasion of filling the expanded beads in a cavity of a mold, the cracking is explained as a method of efficiently filling expanded beads in an amount of more than the cavity volume. In addition, an open portion of the mold so as to not completely close the mold is called "cracking" and is expressed as a ratio (%) of a volume of the open portion to a cavity volume of the mold. As for the molding by cracking, after the expanded beads are filled in the mold, on the occasion of introducing steam, the mold is finally closed, and as a result, the filled expanded beads are compressed and molded.

EXAMPLES

The present invention is hereunder described in more detail by reference to Examples, but it should be construed that the present invention is by no means limited by these Examples.

[Evaluation]

The expanded beads and the expanded beads molded articles used in the Examples and Comparative Examples were evaluated in the following manners. On the occasion of evaluating the molded article, a sample obtained by allowing an expanded beads molded article after finishing aging and the like to stand under a condition at 23° C. and a humidity of 50% for 24 hours was subjected to measurement and the like.

(Weight of Expanded Beads)

As for the bead weight, 100 beads were randomly selected, and the weights [mg] of the selected 100 beads were measured and divided by 100 to calculate an average bead weight [mg].

(Apparent Density, Bulk Density, and Average Bead Diameter of Expanded Beads)

The measurement was performed by the aforementioned methods.

(Average Cell Diameter of Expanded Beads and Expanded Beads Molded Article)

With respect to the expanded beads and the expanded beads molded article, the measurement was performed by the aforementioned method, thereby determining an arithmetic average value.

(Gel Fraction of Expanded Beads and Molded Article)

The measurement was performed by the aforementioned hot xylene extraction method.

(Molded Article Density of Expanded Beads Molded Article)

The measurement was performed by the aforementioned measurement method.

(Number of Expanded Beads on Surface of Expanded Beads Molded Article)

The measurement was performed by the aforementioned measurement method.

(Flexural Modulus of Multi-Block Copolymer)

The flexural modulus of the multi-block copolymer was measured in conformity with the measurement method described in JIS K7171 (2016). The measurement was performed by producing a specimen of 80×10×4 mm and performing three-point bending using 10 kg of a load cell under a condition at a distance between supporting points of 64 mm and a bending rate of 2 mm/min. The flexural modulus was calculated from a gradient at a displacement between 0.5 and 1.0 mm.

(Tensile Strength and Tensile Elongation of Expanded Beads Molded Article)

First of all, a cut-out piece was produced in conformity with JIS K6767 (1999) by cutting the expanded beads molded article with a vertical slicer such that all the surfaces thereof were cut surfaces (exclusive of a surface skin portion) and then cut out with a jig saw into a No. 1 dumbbell form (having a measurement portion having a length of 40 mm, a width of 10 mm, and a thickness of 10 mm), to produce a test piece. In the case where the thickness of the molded article is 10 mm or less, a test piece corresponding to the thickness of the molded article was produced. The test piece was subjected to a tensile test at a test speed of 500 mm/min, and a maximum load during that time and a gauge length at the time of cutting were measured. A maximum tensile stress at the time of drawing was defined as a tensile strength, and an elongation at the time of breakage was defined as a tensile elongation.

(Appearance (Shaping Properties and Surface Void))

As for the evaluation of surface appearance and the evaluation of filling properties in a thin-walled part and shaping properties of a thin-walled part, the expanded beads molded article was cut out in a range of 100 mm×100 mm from a central part thereof, to produce a test piece; lines were drawn on the diagonal from corners of the test piece; and the number of voids having a size of 1 mm$^2$ or more on the lines were counted and evaluated according to the following criteria.
A; The number of voids is less than 5.
B: The number of voids is 5 or more and less than 10.
C: The number of voids is 10 or more.
(Restorability of Expanded Beads Molded Article)

The expanded beads molded article corresponding to a dimension of a flat plate mold used for in-mold molding was measured for thickness at an edge portion (portion inside from the edge by 10 mm) and a central part (a position equally dividing in both the longitudinal direction and the transverse direction). After in-mold molding, the molded article was contracted against the thickness of the mold, and therefore, a molded article having a dimension smaller than the mold dimension was obtained. Subsequently, a thickness ratio of the expanded beads molded article ((thickness at central part of molded article)/(thickness at edge portion of molded article)×100(%)) was calculated and evaluated according to the following criteria.
A; The thickness ratio is 95% or more.
B: The thickness ratio is 90% or more and less than 95%.
C: The thickness ratio is less than 90%.
(Surface Hardness of Expanded Beads Molded Article)

A type C durometer hardness can be measured by installing a durometer C (a trade name; Asker Rubber Hardness Tester C Type, manufactured by Kobunshi Keiki Co., Ltd.) prescribed in JIS K7312 (1996) in a constant pressure load instrument (CL-150L, manufactured by Kobunshi Keiki Co., Ltd.). With respect to the both surfaces of the expanded beads molded article, 10 arbitrary places of each of them except the edge portions of the molded article were measured, and an arithmetic average value was determined.

Example 1-1

<Production of Particles of Multi-Block Copolymer>

To 100 parts by weight of an ethylene/α-olefin multi-block copolymer (INFUSE 9530, manufactured by The Dow Chemical Company) having a density of 887 g/L, a melting point of 120° C., a melt flow rate of 5.4 g/10 min (at 190° C. and a load of 2.16 kg), a type A durometer hardness of 86, and a flexural modulus of 28 MPa and having a polyethylene block and an ethylene/α-olefin copolymer block, 1,000 ppm of zinc borate (manufactured by Tomita Pharmaceutical Co., Ltd., Zinc Borate 2335, average particle diameter: 6 μm) as a cell controlling agent, and the contents were put into an extruder and melt kneaded. The resultant was extruded into water from a ϕ1.1-mm die and cut in a bead weight of 1.6 mg by an underwater cutting method, followed by granulation to obtain polymer particles.
<Production of Expanded Beads>

1 kg of the resulting polymer particles were charged in a closed vessel having a capacity of 5 L together with 3 L of water as a dispersing medium, 3 g of kaolin as a dispersant, 0.04 g of a sodium alkylbenzenesulfonate, and 0.8 part by weight of dicumyl peroxide as a crosslinking agent and 7 parts by weight of carbon dioxide (dry ice) as a blowing agent, based on 100 parts by weight of the polymer particles, and the temperature was then raised to 160° C. that is the crosslinking temperature and the expanding temperature under agitation, followed by holding for 30 minutes. Thereafter, while applying a back pressure with carbon dioxide so as to regulate the pressure in the vessel to a fixed pressure of 4.0 MPa (G), the particles having the blowing agent impregnated therein were released under an atmospheric pressure together with the dispersing medium at a temperature of the dispersing medium (expansion temperature) as shown in Table 1, thereby obtaining expanded beads.
<Production of Expanded Beads Molded Article>

The resulting expanded beads were charged in a closed vessel, pressurized with compressed air of 0.2 MPa (G) for 12 hours to impart an internal pressure of 0.05 MPa (G) within the expanded beads, and then taken out. In-mold molding was performed in such a manner that the discharged expanded beads were filled in a flat plate mold having a length of 250 mm, a width of 200 mm, and a thickness of 4 mm; an open part of the mold was set to 7.6 mm (volume of the open part of mold: 380 cm$^3$) without completely closing the mold; and thereafter, the mold was clamped in a state of a ratio of cracking of 190%, heated with steam and then cooled, followed by taking out a expanded beads molded article from the mold. Furthermore, the expanded beads molded article was aged within an oven adjusted at 60° C. for 12 hours and then taken out, thereby providing an expanded beads molded article. The resulting molded article was evaluated with respect to the molded article density, the gel fraction, the surface properties, the surface hardness, and the like. These results are shown in Table 1 together with the various conditions and the like.

Example 1-2

In Example 1-1, the expanded beads were filled in a flat plate mold having a length of 250 mm, a width of 200 mm, and a thickness of 20 mm in such a manner that an open part of the mold was set to 4 mm (volume of the open portion of mold: 200 cm$^3$) without completely closing the mold, and thereafter, the mold was clamped in a state of a ratio of cracking of 20%. In addition, a plate-like expanded beads molded article was obtained in the same manner as in Example 1-1, except for decreasing the molding pressure. These results are shown in Table 1 together with the molding condition and the like.

In view of the fact that since using the expanded beads having a specified resin weight, and the molding is performed so as to satisfy the number of expanded beads on the surface of the molded article, the expanded beads within the mold have favorable secondary expandability and moldability, even when the ratio of cracking was 20%, the expanded beads molded article satisfying both fusion bondability and surface properties was obtained.

Examples 2-1 and 2-2

On the occasion of producing the expanded beads of Example 1-1, the expanded beads were prepared so as to have a particle weight of 5.0 mg by using a ϕ1.3-mm die; and the evaluation was performed with respect to an expanded beads molded article of Example 2-1 obtained in the same manner as in Example 1-1, except for setting the thickness of the mold to 4 mm, and an expanded beads molded article of Example 2-2 obtained in the same manner as in Example 1-2, except for setting the thickness of the mold to 20 mm. The results are shown in Table 1.

Comparative Examples 1-1 and 1-2

Expanded beads molded articles were obtained under the same condition as in Examples 1-1 and 1-2, respectively, except that on the occasion of producing the expanded beads, the expanded beads were prepared so as to have a particle weight of 0.4 mg by using a ϕ0.6-mm die.

In Comparative Example 1-1, a molded article having a target expansion ratio could not be obtained, and in particular, the fusion bonding in the interior of the molded article was lowered, so that the resulting molded article was inferior in fusion bondability, and its tensile elongation was 120% or less. In Comparative Example 1-2, due to the matter that the number of expanded beads on the surface of the molded article is not satisfied, the secondary expandability of the expanded beads was inferior, and the resulting expanded beads molded article was inferior in fusion bondability. In addition, due to the matter that the weight of the expanded beads is small, and the specific surface area of the expanded beads is large, the restorability of the expanded beads molded article was inferior, so that it was difficult to obtain a favorable expanded beads molded article.

Comparative Examples 2-1 and 2-2

Expanded beads molded articles were obtained under the same condition as in Examples 1-1 and 1-2, respectively, except that on the occasion of producing the expanded beads, the expanded beads were prepared so as to have a resin particle weight of 10.0 mg by using a φ1.6-mm die.

In Comparative Example 2-1, due to the matter that the weight of expanded beads is too large, the filling properties of the expanded beads were lowered, a target molded article could not be shaped, and a thin-walled molded article could not be obtained. In Comparative Example 2-2, though the fusion bondability was improved, curved surfaces of the expanded beads remained in the edge parts of the molded article, and the shaping properties were lowered. In addition, voids existed on the surface of the molded article, and the surface properties were lowered, so that a favorable expanded beads molded article could not be obtained.

TABLE 1

| | | | Example 1-1 | Example 1-2 | Example 2-1 | Example 2-2 | Comparative Example 1-1 | Comparative Example 1-2 | Comparative Example 2-1 | Comparative Example 2-2 |
|---|---|---|---|---|---|---|---|---|---|---|
| | Multi-block copolymer | | INFUSE 9530 | INFUSE 9530 | INFUSE 9530 | INFUSE 9530 | INFUSE 9530 | INFUSE 9530 | INFUSE 9530 | INFUSE 9530 |
| | Weight of polymer particles | mg | 1.6 | 1.6 | 5.0 | 5.0 | 0.4 | 0.4 | 10.0 | 10.0 |
| | Cutting mode | | UWC | UWC | UWC | UWC | UWC | UWC | UWC | UWC |
| Expansion condition | Impregnation temperature | °C. | 110 | 110 | 110 | 110 | 110 | 110 | 110 | 110 |
| | Crosslinking temperature | °C. | 160 | 160 | 160 | 160 | 160 | 160 | 160 | 160 |
| | Holding time | min | 30 | 30 | 30 | 30 | 30 | 30 | 30 | 30 |
| | Expansion temperature | °C. | 160 | 160 | 160 | 160 | 160 | 160 | 160 | 160 |
| | Vapor pressure | MPa (G) | 4.0 | 4.0 | 4.0 | 4.0 | 4.0 | 4.0 | 4.0 | 4.0 |
| Expanded beads | Weight of expanded beads | mg | 1.6 | 1.6 | 5.0 | 5.0 | 0.4 | 0.4 | 10.0 | 10.0 |
| | Apparent density | g/L | 65 | 65 | 83 | 83 | 90 | 90 | 83 | 83 |
| | Bulk density | g/L | 41 | 41 | 52 | 52 | 56 | 56 | 52 | 52 |
| | Average bead diameter | μm | 3.3 | 3.3 | 4.7 | 4.7 | 1.8 | 1.8 | 6.2 | 6.2 |
| | Gel fraction | wt % | 45 | 45 | 54 | 54 | 52 | 52 | 55 | 55 |
| | Average cell diameter | mm | 121 | 121 | 114 | 114 | 67 | 67 | 110 | 110 |
| Molding condition | mold thickness | mm | 4 | 20 | 4 | 20 | 4 | 20 | 4 | 20 |
| | Internal pressure | MPa (G) | 0.05 | 0.10 | 0.05 | 0.10 | 0.05 | 0.10 | 0.05 | 0.10 |
| | Cracking | % | 190 | 20 | 190 | 20 | 190 | 20 | 190 | 20 |
| | Molding pressure | (G) | 0.36 | 0.20 | 0.36 | 0.20 | 0.36 | 0.20 | 0.36 | 0.20 |
| Expanded beads molded article | Density of molded article | g/L | 122 | 49 | 141 | 55 | 149 | 67 | — | 60 |
| | Gel fraction | wt % | 45 | 45 | 54 | 54 | 52 | 52 | — | 55 |
| | Average cell diameter | μm | 121 | 121 | 114 | 114 | 67 | 67 | — | 110 |
| | Number of expanded beads on the surface | per cm$^2$ | 17.2 | 15.1 | 8.8 | 7.6 | 37.1 | 32.8 | — | 2.8 |
| | Tensile strength | MPa | 0.73 | 0.68 | 0.55 | 0.35 | 0.40 | 0.3 | — | 0.35 |
| | Tensile elongation | % | 180 | 260 | 140 | 180 | 105 | 43 | — | 150 |
| | Restorability | | A | A | A | A | A | C | — | A |
| | Appearance (shaping properties and surface void) | | A | A | A | A | A | B | — | C |
| | Surface hardness (type C durometer hardness) | | 35 | 18 | 40 | 19 | 44 | 22 | — | 20 |

INDUSTRIAL APPLICABILITY

The expanded beads molded article of the present invention is an in-mold expanded beads molded article of expanded beads containing a crosslinked multi-block copolymer containing a polyethylene block and an ethylene/α-olefin copolymer block, wherein a density of the expanded beads molded article is 40 to 150 g/L; a gel fraction by a hot xylene extraction method is 30 to 70% by weight; a bead weight of the expanded beads is 0.8 to 8 mg; the number of expanded beads per unit area on a surface of the expanded beads molded article is 5 to 30 per cm$^2$; and a tensile elongation of the expanded beads molded article is 120% or more. Therefore, an expanded beads molded article which is excellent in fusion bondability and surface properties can be provided, and can be suitably utilized for a seat cushioning material, a pad material for sporting, a shoe sole material, a floor material, and the like

The invention claimed is:

1. An expanded beads molded article of expanded beads comprising a crosslinked multi-block copolymer containing a polyethylene block and an ethylene/α-olefin copolymer block, wherein a density of the expanded beads molded article is from 40 to 150 g/L; a gel fraction of the expanded beads molded article by a hot xylene extraction method is from 30 to 70% by weight; a tensile elongation of the expanded beads molded article is 120% or more; a bead weight of the expanded beads is from 0.8 to 8 mg; and the number of expanded beads per unit area on a surface of the expanded beads molded article is from 5 to 30 per $cm^2$.

2. The expanded beads molded article according to claim 1, wherein an average cell diameter of the expanded beads molded article is from 50 to 200 μm.

3. The expanded beads molded article according to claim 1, wherein the bead weight of the expanded beads is from 1 to 4 mg.

4. The expanded beads molded article according to claim 1, wherein a type C durometer hardness of a molded article surface of the expanded beads molded article is from 15 to 50.

5. The expanded beads molded article according to claim 1, wherein the expanded beads molded article has a thin-walled part having a minimum thickness of 5 mm or less.

6. The expanded beads molded article according to claim 1, wherein the multi-block copolymer is a multi-block copolymer containing a polyethylene block and an ethylene/1-octene copolymer block.

* * * * *